United States Patent [19]

Shaw

[11] Patent Number: 5,153,568
[45] Date of Patent: * Oct. 6, 1992

[54] LIQUID CRYSTAL DISPLAY PANEL SYSTEM AND METHOD OF USING SAME

[75] Inventor: Robert W. Shaw, Escondido, Calif.

[73] Assignee: Proxima Corporation, San Diego, Calif.

[ * ] Notice: The portion of the term of this patent subsequent to Oct. 29, 2008 has been disclaimed.

[21] Appl. No.: 690,700

[22] Filed: Apr. 24, 1991

Related U.S. Application Data

[63] Continuation of Ser. No. 472,668, Jan. 30, 1990, abandoned, which is a continuation-in-part of Ser. No. 222,144, Jul. 21, 1988, abandoned.

[51] Int. Cl.⁵ .............................................. G09G 3/36
[52] U.S. Cl. .................................. 340/703; 340/784; 340/793; 358/455
[58] Field of Search ............... 340/701, 703, 765, 784, 340/793; 358/236, 241, 455; 359/36, 53, 54, 64, 66, 68

[56] References Cited

U.S. PATENT DOCUMENTS

| | | |
|---|---|---|
| 3,703,329 | 11/1972 | Castellano . |
| 3,785,721 | 1/1974 | Harsch . |
| 3,811,751 | 5/1974 | Myer . |
| 3,863,246 | 1/1975 | Treka et al. .......... 340/784 |
| 3,997,719 | 12/1976 | Judice .................. 340/793 |
| 4,044,546 | 8/1977 | Koike ..................... 368/70 |
| 4,068,926 | 1/1978 | Nakamura et al. . |
| 4,097,128 | 6/1978 | Matsumoto et al. . |
| 4,097,130 | 6/1978 | Cole, Jr. . |
| 4,127,322 | 11/1978 | Jacobson et al. . |
| 4,171,874 | 10/1979 | Bigelow et al. . |
| 4,232,948 | 11/1980 | Shanks . |
| 4,241,339 | 12/1980 | Ushiyama .............. 340/702 |
| 4,299,447 | 11/1981 | Soltan et al. . |
| 4,349,817 | 9/1982 | Hoffman et al. ....... 340/784 |
| 4,394,069 | 7/1983 | Kaye . |
| 4,411,496 | 10/1983 | Nonomura et al. . |
| 4,416,514 | 11/1983 | Plummer . |
| 4,487,481 | 12/1984 | Suzawa . |
| 4,531,160 | 7/1985 | Ehn ....................... 340/793 |
| 4,547,043 | 10/1985 | Penz . |
| 4,608,558 | 8/1986 | Amstutz et al. ....... 340/784 |
| 4,613,207 | 9/1986 | Fergason . |
| 4,634,229 | 1/1987 | Amstutz et al. . |
| 4,652,101 | 3/1987 | Grunwald ............. 353/122 |
| 4,659,183 | 4/1987 | Suzawa . |
| 4,671,634 | 6/1987 | Kizaki et al. ......... 353/122 |
| 4,697,884 | 10/1987 | Amstutz et al. . |
| 4,706,077 | 11/1987 | Roberts et al. ....... 340/793 |
| 4,722,593 | 2/1988 | Shimazaki . |
| 4,723,840 | 2/1988 | Humbert et al. . |
| 4,726,663 | 2/1988 | Buzak . |
| 4,745,406 | 5/1988 | Hayashi et al. ...... 340/784 |
| 4,756,604 | 7/1988 | Nakatsuka et al. . |
| 4,758,818 | 7/1988 | Vatne ................... 340/701 |
| 4,759,612 | 7/1988 | Nakatsuka et al. . |
| 4,761,058 | 8/1988 | Okubo et al. ........ 340/784 |
| 4,769,713 | 9/1988 | Yasui ................... 358/236 |
| 4,770,500 | 9/1988 | Kalmanash et al. . |
| 4,770,525 | 9/1988 | Umeda et al. ........ 353/122 |
| 4,789,854 | 12/1988 | Ishii .................... 340/703 |
| 4,796,978 | 1/1989 | Tanaka et al. . |
| 4,808,991 | 2/1989 | Tachiuchi et al. .... 340/793 |
| 4,812,034 | 3/1989 | Mochizuki et al. ... 353/122 |
| 4,813,770 | 3/1989 | Clerc et al. . |
| 4,827,255 | 5/1989 | Ishii .................... 340/793 |
| 4,832,461 | 5/1989 | Yamagishi et al. . |
| 4,838,655 | 6/1989 | Hunahata et al. . |
| 4,886,343 | 12/1989 | Johnson .............. 340/784 |
| 4,944,578 | 7/1990 | Denison .............. 340/784 |
| 5,062,001 | 10/1991 | Farwell et al. ....... 340/793 |

Primary Examiner—Alvin E. Oberley
Assistant Examiner—Richard Hjerpe
Attorney, Agent, or Firm—Bernard L. Kleinke; Jerry R. Potts; William Patrick Waters

[57] ABSTRACT

The display system includes a liquid crystal display panel unit having three different color components for each pixel of the resulting display. Each one of the individual color components of a pixel of the liquid crystal display panel unit is activated selectively by a corresponding one of a set of video processing units. Each video processing unit is responsive to a video signal from a conventional computer processor for causing the reproduction of a component of a colored image. Each video processing unit includes a translating arrangement for converting a component part of the computer generated video signal into a binary digital signal indicative of a single one of the color components for mixing with other color components to reproduce faithfully the computer generated color image.

44 Claims, 8 Drawing Sheets

FIG. 5A (COLOR = 4)

IF COLOR > COUNT VALUE THEN TURN PIXEL ELEMENT ON (SHADED AREAS)

| | | | | | | SIGNAL COUNT VALUES | | | | | | | | |
|---|---|---|---|---|---|---|---|---|---|---|---|---|---|---|
| A | 4 | *3* | *0* | 6 | *1* | 5 | *2* | 4 | *3* | *0* | 6 | *1* | 5 | *2* |
| B | *1* | 5 | *2* | 4 | *3* | *0* | 6 | *1* | 5 | *2* | 4 | *3* | *0* | 6 |
| C | *1* | 5 | *2* | 4 | *3* | *0* | 6 | *1* | 5 | *2* | 4 | *3* | *0* | 6 |

*(italicized values indicate shaded cells where COLOR > count value)*

FIG. 5B (COLOR = 0)

| | | | | | | SIGNAL COUNT VALUES | | | | | | | | |
|---|---|---|---|---|---|---|---|---|---|---|---|---|---|---|
| A | 4 | 3 | 0 | 6 | 1 | 5 | 2 | 4 | 3 | 0 | 6 | 1 | 5 | 2 |
| B | 1 | 5 | 2 | 4 | 3 | 0 | 6 | 1 | 5 | 2 | 4 | 3 | 0 | 6 |
| C | 1 | 5 | 2 | 4 | 3 | 0 | 6 | 1 | 5 | 2 | 4 | 3 | 0 | 6 |

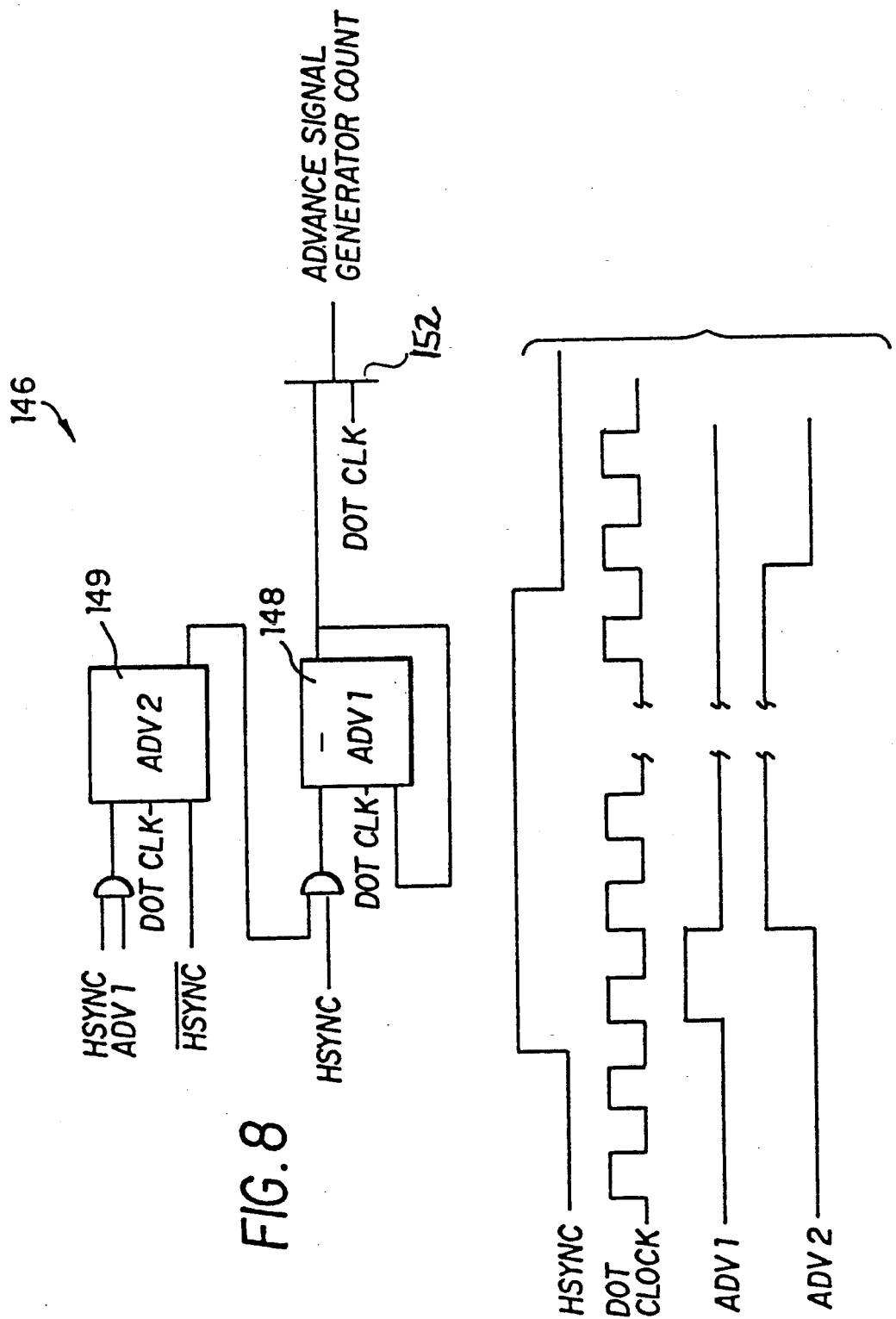

LIQUID CRYSTAL DISPLAY PANEL SYSTEM AND METHOD OF USING SAME

RELATED PATENTS

This is a continuation, of application Ser. No. 07/472,668, filed on Jan. 30, 1990, now abandoned, which is a continuation-in-part of U.S. patent application Ser. No. 07/222,144, filed Jul. 21, 1988, entitled "GRAY SCALE SYSTEM FOR VISUAL DISPLAYS", now abandoned.

DESCRIPTION

1. TECHNICAL FIELD

The present invention relates, in general, to a liquid crystal display panel system, and a method of using it to provide multi-colored images. More particularly, the present invention relates to a liquid crystal display panel system and a method of using it, to produce large numbers of colors for the images, in a clear, visually discernable manner.

2. Background Art

There have been several different types and kinds of computer output devices for viewing computer generated information. Such devices include video monitors, and active liquid crystal display panels. Modernly, liquid crystal display panels have been used with projectors for the purpose of displaying computer generated images onto a large screen for viewing by an audience.

There are typically two common techniques for projecting computer generated images. One such technique utilizes cathode ray tube based video projectors such as the projectors manufactured by Electrohome and Sony. Another such technique utilizes liquid crystal display panels in conjunction with overhead projectors such as the panels manufactured by Computer Accessories Corporation, Kodak and Sharp.

Such prior known systems displayed black and white computer generated images. It has been found desirable to project computer generated color images. It has been found desirable to project computer generated color images.

One such color system is shown and described in the above-referenced copending U.S. continuation-in-part patent application, which discloses a gray scaling technique for simulating color. While this approach has proven successful for certain applications, it is intended to produce only shades of gray for simulating colors.

Another technique is disclosed in U.S. Pat. No. 4,769,713, which describes an expanded liquid crystal display panel that emulates a conventional color monitor by having three sub-pixels for each display matrix point. Thus, unlike a monochromatic liquid crystal display panel employing only one pixel element for each display matrix point, the expanded liquid crystal display produces colors by using red, green, and blue color filter elements in an alternating pattern over the display matrix. In this regard, the color filters are either horizontal or vertical stripes, or dot triads (triangles) such as found in most conventional color television receivers.

Another approach at solving the problems of the prior known projection systems, has been to utilize three separate liquid crystal display panels, each panel being of a different color. The corresponding pixels of the three panels are aligned with one another. The three different colors combine to produce a desired computer generated color image.

Such a configuration has not proven entirely satisfactory, since only a few number of colors may be easily achieved. In this regard, only a few number of colors are produced, and thus the images being produced are not always faithfully reproduced. Since there have been only a limited number of colors available, the resulting image would only be a coarse approximation of the actual color of the image being reproduced.

Therefore, it would be highly desirable to have a new and improved liquid crystal display panel system and method of using it, to produce large numbers, such as hundreds, of colors, for visual display purposes.

DISCLOSURE OF INVENTION

Therefore, the principal object of the present invention is to provide a new and improved liquid crystal display panel system and method for using it, to produce a large number of colors for its images.

Another object of the invention is to provide such a new and improved liquid crystal display panel system and method for using it, without introducing any substantial perceptible flicker of the image.

Briefly, the above and further objects and features of the present invention are realized by providing a new and improved liquid crystal display panel system for producing a large number of colors of displayable images, in a faithful manner. Moreover, the color images are stable in appearance, and are not perceived to flicker, to any noticeable extent. The system of the present invention can be used with various color liquid crystal display technologies, for example, stacked panels and color striped active matrix panels.

The display system includes a liquid crystal display panel unit having three different color components for each pixel of the resulting display. Each one of the individual color components of a pixel of the liquid crystal display panel unit is activated selectively by a corresponding one of a set of video processing units. Each video processing unit is responsive to a video signal from a conventional computer processor for causing the reproduction of a component of a colored image. Each video processing unit includes a translating arrangement for converting a component part of the computer generated video signal into a binary digital signal indicative of a single one of the color components for mixing with other color components to reproduce faithfully the computer generated color image.

Each video processing unit also includes a flicker inhibitor arrangement for facilitating the digital display of the individual pixel elements without introducing an unacceptable level of flicker in the displayed computer generated image.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, where-in:

FIGS. 5A and 5B are graphs illustrating the video processing units of FIG. 2 cooperating together to generate specific shadings of colors for display purposes;

FIG. 8 is a detailed block diagram of the advancing counter of the system of FIG. 6; and FIG. 9 are waveform diagrams showing the states of the advancing counter of FIG. 8.

BEST MODE FOR CARRYING OUT THE INVENTION

Figure 1:
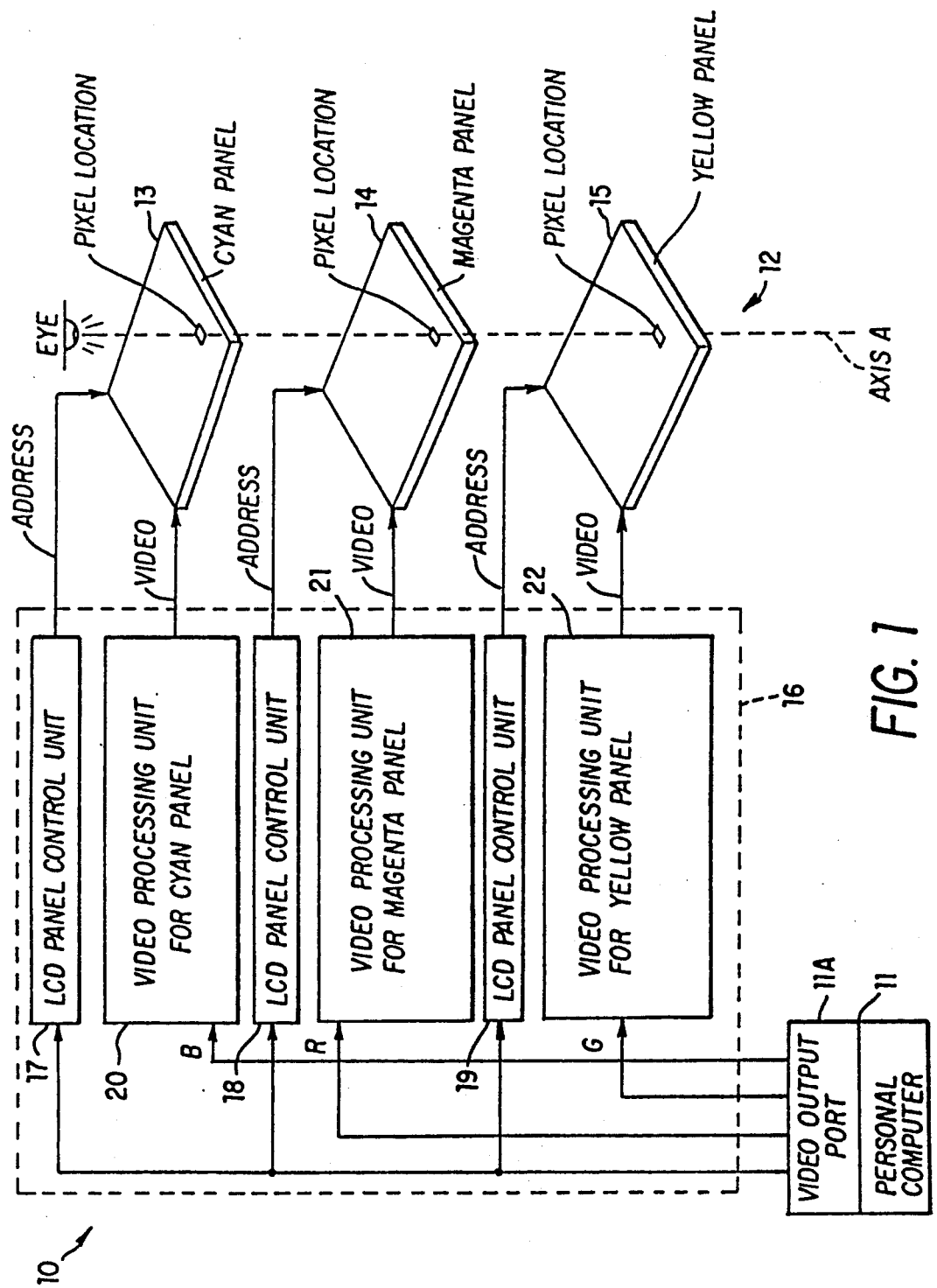
FIG. 1 is a partially diagrammatic, block diagram of a liquid crystal display system employing a stacked panel configuration constructed in accordance with the invention.

Referring now to FIG. 1 of the drawings, there is shown a liquid crystal display panel system 10 which is constructed in accordance with the present invention. The system 10 is adapted to be used with a conventional personal computer 11, which generates a video output signal indicative of a color image for visual display purposes.

The system 10 may be used with a projector (not shown) in a manner as shown and described in the first-mentioned parent patent application. However, the display system of the present invention may be employed for various different types and kinds of display arrangements for producing images, which may or may not be displayed.

The system 10 generally comprises a liquid crystal display panel unit 12 having three stacked monochrome liquid crystal display panels 13, 14 and 15 respectively, for displaying computer-generated colored images. Each of the liquid crystal display panels 13-15 includes a pixel matrix array for generating a selected number of image elements in a complementary color (tinted yellow, magenta and cyan) for forming the computer generated color image.

The display panels 13, 14 and 15 are supertwist panels, and are arranged in alignment with one another, so that corresponding pixel locations in the individual panels are aligned with one another along a common viewing or display axis, such as axis A in FIG. 1. While the panels are shown diagrammatically in FIG. 1 for illustration purposes, in a spaced apart manner, in actual use, the three panels are secured together, and are combined in a unitary construction with conventional polarizer and filter elements (not shown) which are conventionally used in connection with liquid crystal display panels.

By stacking the panels, a viewer sees a resulting compound color formed by the complementary color panels as corresponding pixel locations in each of the individual liquid crystal display panels are switched on and off, to generate a color image by a substractive color blending process.

The system 10 also includes a display panel processing unit 16 for interfacing the liquid crystal display panel unit 12 to the personal computer 11. The liquid crystal processing unit 16 has a set of conventional liquid crystal display panel control units 17, 18 and 19 for addressing the individual pixel matrix locations in the respective display panels 13, 14 and 15. The liquid crystal display panel control units 17, 18 and 19 for addressing each pixel matrix location are conventional integrated circuits and well known to those skilled in the art.

In order to process the component parts of the computer generated video signal into individual binary digital signals for driving each respective display panels 13, 14, and 15 to produce a color image, the liquid crystal processing unit 16 also includes a set of video processing units 20, 21 and 22 respectively. Each one of the liquid crystal display panels 13, 14 and 15 in the display panel unit 12 is electrically coupled to an associated one of the video processing units, 20, 21 and 22, respectively, for causing the reproduction of a color image.

In operation, a personal computer 11 generates conventional RGB video analog signals indicative of computer generated colored images composed of a large number of pixel elements. The RGB video analog signal is indicative of three individual primary color components (red, green, blue) for each pixel element, including the respective brightness of each component for reproducing a color image. The computer generated signals also include corresponding control signals (horizontal and vertical sync) indicative of a pixel matrix address for selecting the individual pixel elements to reproduce the color image.

The control signals are coupled to each of the respective liquid crystal display panel control units 17, 18 and 19, in order that a set of corresponding pixel elements are simultaneously addressed in each of the display panels 13, 14 and 15 respectively. In order to drive a selected set of corresponding pixel elements into their respective color-producing states or conditions, the RGB video analog signals are also coupled to the panel unit 12 via the respective control units 17, 18 and 19. The R, G, and B components of the computer generated video signals are separated so that only one primary color element of the RGB signals is coupled to an individual one of the video processing units 20, 21 and 22 for producing color shading.

As best seen in FIG. 1, each one of the video processing units converts one element of the RGB video analog signals into a translated binary digital signal indicative of a weighted intensity or shading level of a complementary color to be produced at the addressed pixel location in the corresponding monochromatic display panel. For example, video processing unit 20 converts the blue component of the RGB signals for the cyan panel 15, video processing unit 21 converts the red component of the RGB signal for the magenta panel 16 and video processing unit 22 converts the green component of the RGB signal for the yellow panel 14.

The translated binary digital signals in each one of the video processing units 20, 21 and 22 are synchronously coupled to the individual liquid crystal display panels 13, 14, 15 so that the selected pixel or picture elements may be turned off and on for predetermined periods of time to produce the desired shading in each of the complementary colors. In this regard, after an individual one of the RGB color component signals has been translated into a shading level of color, the translated digital signal is then compared with a repetitively generated set of digital signals indicative of a corresponding fixed or predetermined weighted intensity or shading level of color to determine whether the weighted intensity level of the translated digital signal is greater than the weighted intensity level of the repetitive digital signal. If the translated digital signal is greater than the repetitive digital signal, single video drive signal is generated for causing the addressed pixel element of the corresponding display panel to be switched on and off, to produce the desired color shading without introducing any substantial flicker in the displayed color image.

The above described operation takes advantage of the relatively long response time of the supertwist liquid crystal display panel, by turning the corresponding pixel elements on and off, in a randomly predetermined manner for controlling the average duty cycle of the displayed pixels to produce graduations in intensity or shading levels, without introducing unacceptable flicker.

For example, a complete frame or scan of a supertwist liquid crystal display panel typically occurs at a 30 Hz rate. However, a typical supertwist liquid crystal display panel pixel element typically takes 200 to 300 milliseconds to switch states. Thus, for example, over seven frames of displayed information, the slow panel response time of 200-300 milliseconds tends to average the fluctuations of the predetermined randomized or averaged single video drive signal produced by a video processing unit, such as video processing unit 20. In summary, by providing a set of synchronously driven binary digital signals to each one of the liquid crystal display panels, with each one of the signals having a cycle time or period that is less than the panel response time, multiple shades of colors are produced with substantially very little flicker being introduced.

The following will better describe the importance of turning the corresponding pixel elements on and off, in a predetermined randomized manner. Each of the monochrome liquid crystal display panels 13, 14 and 15 are scanned for a certain number of "dot clock" signals for each frame or matrix of displayed information. The dot clock is derived from the "Horizontal Sync" signal provided via a video output 11A (FIG. 1) associated with the personal computer 11. For example, in an IBM VGA matrix screen or frame, there are 800 dot clocks per each horizontal matrix line (640 visible dot clocks periods, and 160 dot clock periods for synchronizing and blanking intervals) and 525 horizontal lines per each frame (480 visible lines, and 45 invisible lines for synchronizing and blanking intervals). In this regard, the number of dot clocks that occur from one frame to the next frame of information for any given pixel matrix location, is 800 times 525, or 420,000 dot clocks. Thus, in order to prevent the dot clock from establishing a frequency that "beats" with the video clock to produce a noticeable flicker pattern, a predetermined sequence of signals controls the pixel elements to turn them on and off as necessary. If this is not the case, the corresponding pixels can be excited for every frame, and stationary patterns (lines) can appear in the displayed visual image. In summary, the predetermined sequence of the repetitive digital signals has the effect of averaging over a series of image frames, in a similar manner to the technique disclosed in the first-mentioned parent patent application. However, in the parent application, a random number generator is disclosed, instead of a predetermined sequence.

Figure 2:
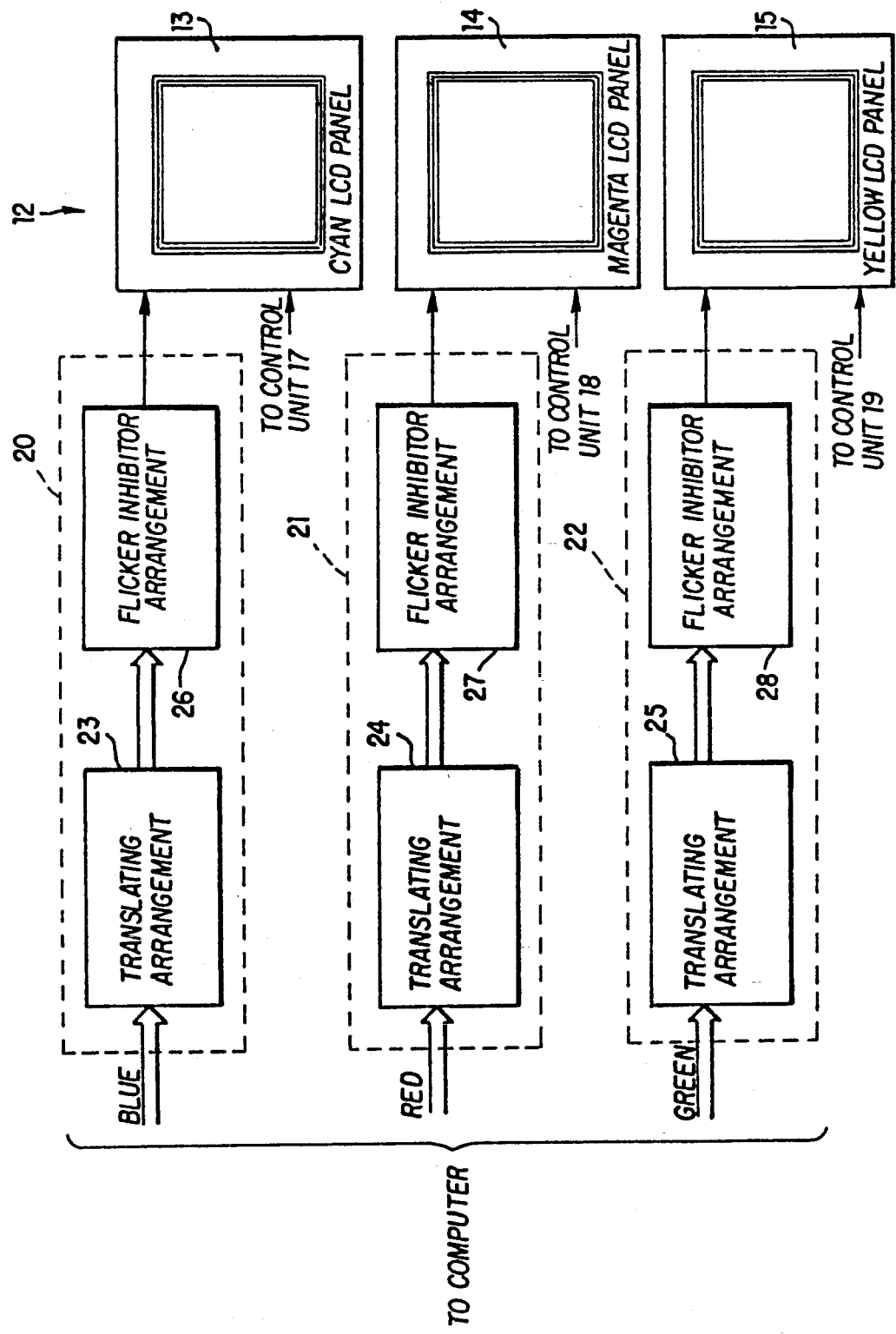
FIG. 2 is a detailed block diagram of the display panels and individual video processing units of FIG. 1.

Considering now the liquid crystal processing unit 16 in greater detail with reference to FIGS. 1 and 2, the unit 16 includes the control units 17, 18 and 19 for addressing and interfacing the monochromatic display panels 13, 14 and 15 respectively and the corresponding set of video processing units 20, 21 and 22 for processing the computer generated video signal for each of the liquid crystal display panels 13, 14 and 15, respectively.

As best seen in FIG. 2, for the purpose of averaging the computer generated video signal into individual digital signals for each of the liquid crystal display panels 13, 14, 15 respectively, each of the video processing units 20, 21, and 22 include a translating arrangement, such as arrangements 23, 24 and 25, respectively and a set of corresponding flicker inhibitor arrangements, such as flicker inhibitor arrangements 26, 27 and 28, respectively.

As the circuitry and operation of each of the video processing units 20, 21 and 22 are substantially identical only the video processing unit 20 will be described hereinafter in greater detail.

Figure 3:
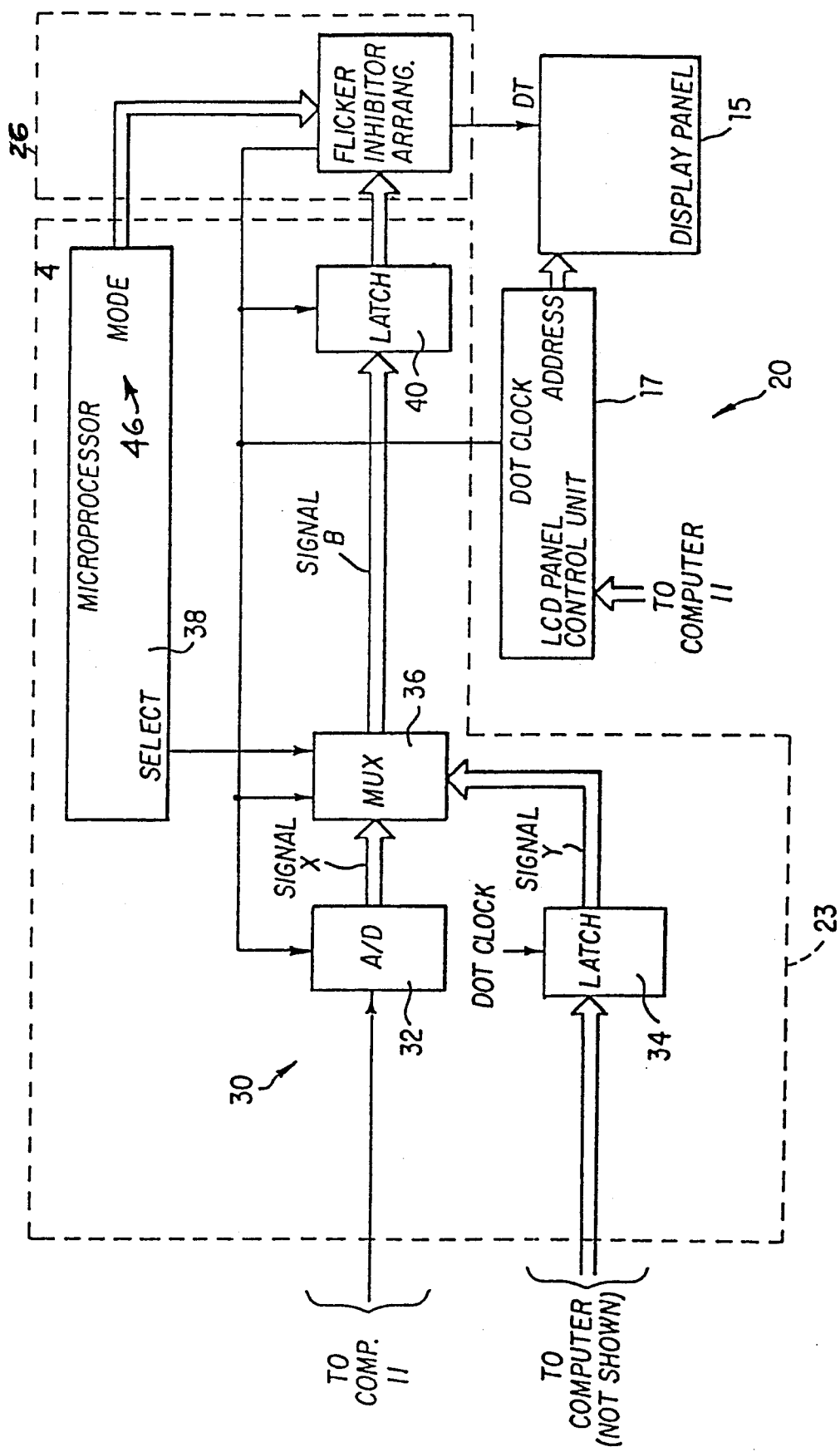
FIG. 3 is a detailed block diagram of an individual translating arrangement of FIG. 2.

Considering now the video processing unit 20 in greater detail with reference to FIG. 3, the video processing unit 20 includes the translating arrangement 23 that generally comprises a coupling circuit 30 for coupling the translating arrangement 23 to the video output signals of the personal computer 11. The coupling circuit 30 includes a conventional analog to digital converter 32 for translating the RGB video analog signal into a 4-bit digital signal that is indicative of a weighted intensity or shading level of a single color, and a microprocessor 38 for selecting a given mode of operation as will be explained hereinafter in greater detail. The relationship between the mode of operation and the 4-bit digital signal level is important for producing hundreds of colors from the liquid crystal display panel unit 12 as the following will explain.

Most colors can be synthesized from a mixture of three primary colors: red, green and blue. A color television set illustrates this fact in that color dots are formed from three sub-dots made up of these three primary colors.

The color television set also illustrates another color perception principle, that is, two colors placed close together and viewed at a distance will appear to blend together into a third color. Accordingly, when added together in the correct proportions, the three primary colors form the color white:

White = Red + Green + Blue.

The primary colors of red, green and blue can also be mixed together to form a second set of colors, called the complementary colors of cyan, magenta and yellow:

Cyan = Blue + Green

Magenta = Red + Blue

Yellow = Red + Green.

Blending the complementary colors of cyan, magenta and yellow together also produces the color white:
White = Cyan + Magenta + Yellow.

From the foregoing it should be understood that when a primary color is added to its complement, the color white is produced:

White = Red + Green + Blue = Yellow + Blue

White = Red + Green + Blue = Magenta + Green

White = Red + Green + Blue = Cyan + Red.

As the above described color combination equations demonstrate, the effect of mixing the primary colors of red, green and blue can be exactly duplicated by using the complementary colors of cyan, magenta and yellow. More particularly:

Red = White − Cyan

Green = White − Magenta

Blue = White − Yellow.

These equations represent the subtractive color methodology utilized in the present inventive stacked panel process for producing hundreds of colors. Each complementary color can be shaded into eight different and discrete levels, and thus $8\times8\times8$ or 512 colors can be produced.

In order to provide the greatest brightness from the stacked panel unit 12, the individual stacked panels 13, 14 and 15 are selected for their complementary color characteristics of yellow, magenta and cyan respectively. This panel grouping produces a more intense brightness, as compared to a grouping of primary color panels. In this regard, the human eye responds to different colors with different sensitivities, according to the following well known percentages where the color white has a perceived brightness of 100%:

Green = 59%

Red = 30%

Blue = 11%.

Stated differently, if a viewer observes a light source composed of each primary colors with equal intensities, the color green appears to be the brightest of the three colors. The color red is the next brightest, and the color blue is the least bright of the three colors. Combining such primary colors into their complementary colors, produces the following brightness values:

Yellow = White − Blue = 100 − 11 = 89%

Magenta = White − Green = 100 − 59 = 41%

Cyan = White − Red = 100 − 30 = 70%.

Thus, the complementary colors of yellow, magenta and cyan are brighter as perceived by the human eye, and therefore enable a brighter projected image to be produced.

It will be understood by those skilled in the art that, although the preferred form of the present invention includes a computer generated RGB analog video system with a stacked panel unit having complementary colors, other conventional computer color monitor systems, such as the IBM Enhanced Graphic Adapter ("EGA") or an RGB digital system, may be employed, in accordance with the teachings of the present invention. For example, as shown in FIG. 3 the present translating arrangement 23 includes a digital latch 34 for accommodating a digital RGB video signal system and a multiplexor 36 for selecting between the RGB video analog signal, shown generally as signal X and a RGB video digital signal, shown generally as signal Y. In this regard, the multiplexor 36 is controlled by the microprocessor 38 which enables only selected ones of digital input signals to be selected for translating the signal into a 4-bit digital signal indicative of a shaded complementary color.

In order to help facilitate the driving of the pixel matrix of the liquid crystal display panel 15 in a substantially flicker-free manner, the translating arrangement 23 also includes a latch 40 that temporarily stores the 4-bit output signal of the multiplexor 36, shown generally as signal B. The output of latch 40 is connected to the flicker inhibitor arrangement 26 that converts the 4-bit output signal into a single bit binary signal that produces the desired shading level without introducing any substantial flicker in the selected pixel elements as will be explained hereinafter in greater detail.

In order to synchronize the translating arrangement signals with the video output signals of the computer 11, liquid crystal display panel control unit 19 generates a video dot clock signal which is utilized to step the RGB signal generated by the personal computer 11 through each successive stage of the respective translating arrangements.

Figure 4:
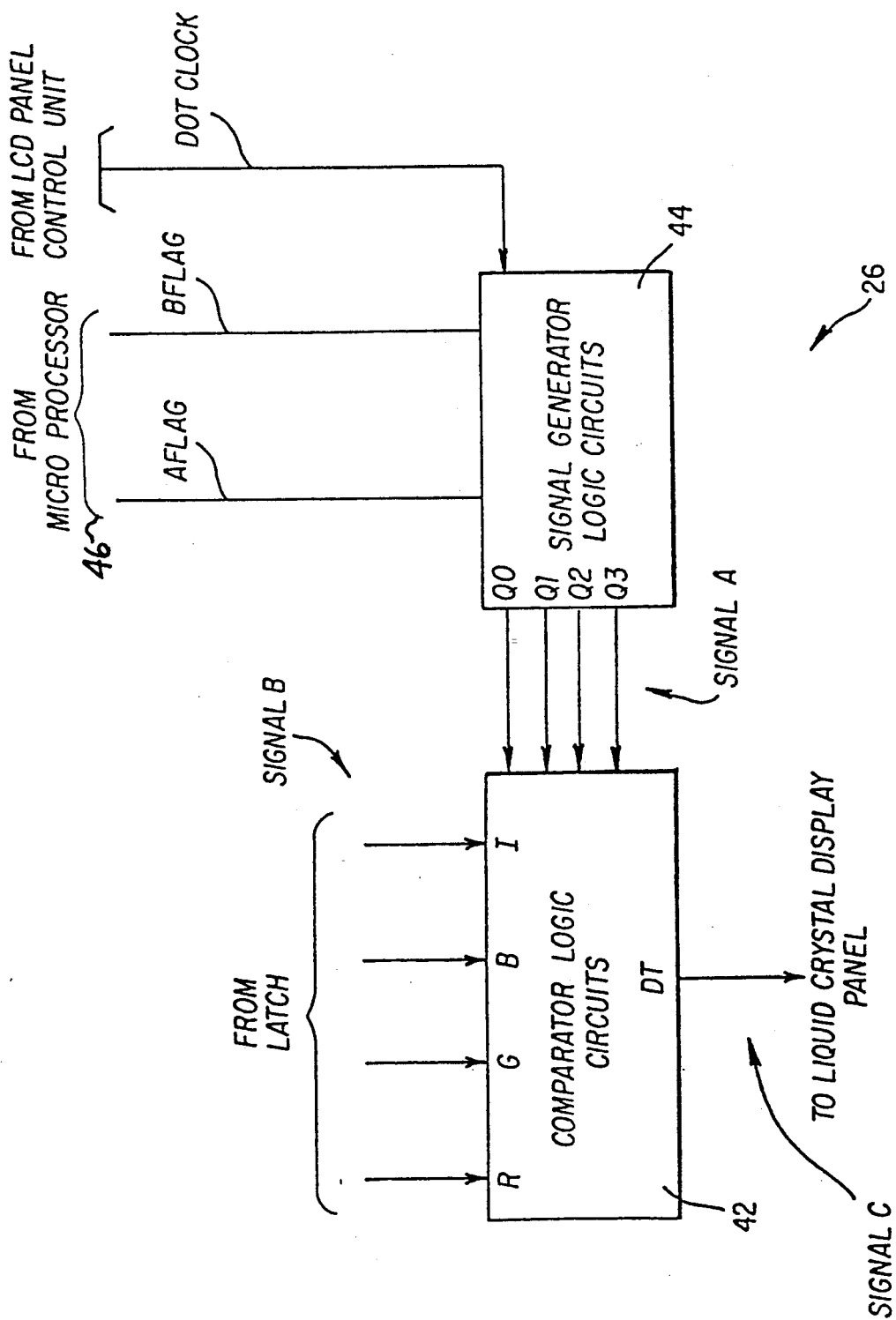
FIG. 4 is a detailed block diagram of one of the flicker inhibitor arrangements of FIG. 2.

Considering now the flicker inhibitor arrangement 26 in greater detail with reference to FIGS. 2, 3 and 4, the flicker inhibitor arrangement 26 generally comprises a comparator circuit 42 and a signal generator circuit 44 whose output signals change in a predetermined randomly sequenced manner on every dot clock signal. In this regard, the output signals of the signal generator 44 are arranged to translate the 4-bit output signal of latch 40 in a predetermined randomized sequence that optimizes color shading with minimum flicker. In order to convert the 4-bit output signal of latch 40 into a single bit binary signal, the comparator circuit 42 is coupled between the 4-bit output signal generator 44 and the 4-bit output signal of the latch 40. Comparator circuit 42 determines whether the numerical value of the 4-bit digital output signal of the latch 40 (signal B) exceeds the numerical value of the 4-bit digital output signal of the signal generator circuit 44 (signal A), and generates a single bit digital output signal whenever the numerical value of signal B exceeds the numerical value of signal A. The binary output signal of the comparator circuit 44, shown generally as signal C is synchronized with the video timing signal for activating a selected pixel element within the liquid crystal display panel 12.

In order to facilitate the different levels of available shadings or colors represented in a given computer generated video signal, the flicker inhibitor arrangement 26 also includes a mode selection circuit that is coupled between the microprocessor 38 and the signal generator circuit 44. The mode selection circuit 46 in response to a 2-bit control signal generated by the microprocessor 38 selects a predetermined counting sequence that is repeatedly generated by the signal generator circuit 44 for optimizing color shading with minimum flicker. In this regard, microprocessor output signals A FLAG and B FLAG serve to select one of four different modes of operation depending on the number of shading levels available from the personal computer 11. The modes of operation are shown in Table I below:

TABLE I

| MODE OF OPERATION | | |
|---|---|---|
| A FLAG | B FLAG | SHADING LEVELS |
| 0 | 0 | 4 |
| 0 | 1 | 8 |
| 1 | 0 | 16 |

TABLE I-continued

| | MODE OF OPERATION | |
|---|---|---|
| A FLAG | B FLAG | SHADING LEVELS |
| 1 | 1 | 14 |

Considering now the signal generator circuit 44 in greater detail with reference to FIG. 4, the signal generator 44 has a predetermined counting sequence depending on the number of available shading levels which facilitates averaging the output signal (signal C) of the comparator 42 so that no one pixel element in an activated liquid crystal display panel is excited for every frame. Tables II, III, IV and V illustrate the counting sequences of the signal generator circuit 44 for 4, 8, 16 and 14 levels of shading respectively. It should be understood however, that other levels of shading could be implemented within the scope of the present invention, and thus other different count sequences may be employed for other desired shading levels.

Referring now to FIG. 5 and Tables II-V, the principles of the present invention will be described as being applied to an eight level display through the use of the signal generator 44 and the comparator 42.

TABLE II

PREDETERMINED COUNTING SEQUENCE FOR FOUR LEVEL SHADING

| A FLAG | B FLAG | SIGNAL GENERATOR COUNTING SEQUENCE | | | |
|---|---|---|---|---|---|
| | | Q2 | Q1 | Q0 | SIGNAL A EQUALS |
| | | 0 | 0 | 1 | 1 |
| | | 0 | 1 | 1 | 3 |
| 0 | 0 | 1 | 0 | 1 | 5 |

TABLE III

PREDETERMINED COUNTING SEQUENCE FOR EIGHT LEVEL SHADING

| A FLAG | B FLAG | SIGNAL GENERATOR COUNTING SEQUENCE | | | |
|---|---|---|---|---|---|
| | | Q2 | Q1 | Q0 | SIGNAL A EQUALS |
| | | 0 | 0 | 1 | 1 |
| | | 1 | 0 | 1 | 5 |
| | | 0 | 1 | 0 | 2 |
| | | 1 | 0 | 0 | 4 |
| 0 | 1 | 0 | 1 | 1 | 3 |
| | | 0 | 0 | 0 | 0 |
| | | 1 | 1 | 0 | 6 |

TABLE IV

PREDETERMINED COUNTING SEQUENCE FOR SIXTEEN LEVEL SHADING

| A FLAG | B FLAG | SIGNAL GENERATOR COUNTING SEQUENCE | | | | |
|---|---|---|---|---|---|---|
| | | Q3 | Q2 | Q1 | Q0 | SIGNAL A EQUALS |
| | | 0 | 0 | 0 | 0 | 0 |
| | | 0 | 0 | 0 | 1 | 1 |
| | | 0 | 0 | 1 | 0 | 2 |
| | | 0 | 0 | 1 | 1 | 3 |
| | | 0 | 1 | 0 | 0 | 4 |
| | | 0 | 1 | 0 | 1 | 5 |
| 1 | 0 | 0 | 1 | 1 | 0 | 6 |
| | | 0 | 1 | 1 | 1 | 7 |
| | | 1 | 0 | 0 | 0 | 10 |
| | | 1 | 0 | 0 | 1 | 11 |
| | | 1 | 0 | 1 | 0 | 12 |
| | | 1 | 0 | 1 | 1 | 13 |
| | | 1 | 1 | 0 | 0 | 14 |
| | | 1 | 1 | 0 | 1 | 15 |

TABLE IV-continued

PREDETERMINED COUNTING SEQUENCE FOR SIXTEEN LEVEL SHADING

| A FLAG | B FLAG | SIGNAL GENERATOR COUNTING SEQUENCE | | | | |
|---|---|---|---|---|---|---|
| | | Q3 | Q2 | Q1 | Q0 | SIGNAL A EQUALS |
| | | 1 | 1 | 1 | 0 | 16 |

TABLE V

PREDETERMINED COUNTING SEQUENCE FOR FOURTEEN LEVEL SHADING

| A FLAG | B FLAG | SIGNAL GENERATOR COUNTING SEQUENCE | | | | |
|---|---|---|---|---|---|---|
| | | Q3 | Q2 | Q1 | Q0 | SIGNAL A EQUALS |
| | | 0 | 0 | 0 | 0 | 0 |
| | | 0 | 0 | 0 | 1 | 1 |
| | | 0 | 0 | 1 | 0 | 2 |
| | | 0 | 1 | 0 | 0 | 4 |
| | | 0 | 1 | 0 | 1 | 5 |
| | | 0 | 1 | 1 | 1 | 7 |
| | | 1 | 0 | 0 | 0 | 10 |
| | | 1 | 0 | 0 | 1 | 11 |
| 1 | 1 | 1 | 0 | 1 | 0 | 12 |
| | | 1 | 0 | 1 | 1 | 13 |
| | | 1 | 1 | 0 | 0 | 14 |

The output or picture element signal of the comparator 42 can assume only two levels, a binary "0" or a binary "1". When the output signal is a binary "1" the selected pixel element is turned on. When the output signal is a binary "0" the selected pixel element is turned off. Accordingly, to display shading levels between the fully on state of a pixel element and a fully off state of a pixel element it is necessary to switch the pixel element on and off for certain time intervals. The ratio of on-time to the off time is controlled to change the effective shading.

For example, a liquid crystal display panel pixel matrix is scanned on a periodic basis to refresh each of the matrix pixel elements for display purposes. Changes in pixel conditions are visual to the human eye, thus shading variations can be simulated by turning the pixel element on for certain frames and off for other frames. The following table shows eight shading levels that are produced over seven frames of displayed information:

TABLE VI

| | STATE OF ELEMENT TO PRODUCE SHADE | |
|---|---|---|
| SHADING LEVELS | NUMBER OF FRAMES ELEMENT IS ACTIVATED | NUMBER OF FRAMES ELEMENT IS ACTIVATED |
| CLEAR | 0 FRAMES | 7 FRAME SCANS |
| LEVEL 1 | 1 FRAME SCAN | 6 FRAME SCANS |
| LEVEL 2 | 2 FRAME SCANS | 5 FRAME SCANS |
| LEVEL 3 | 3 FRAME SCANS | 4 FRAME SCANS |
| LEVEL 4 | 4 FRAME SCANS | 3 FRAME SCANS |
| LEVEL 5 | 5 FRAME SCANS | 2 FRAME SCANS |
| LEVEL 6 | 6 FRAME SCANS | 1 FRAME SCAN |
| FULL COLOR | 7 FRAME SCANS | 0 FRAME SCAN |

The shading levels shown in Table VI are facilitated by the signal generator 44 (signal A). In this regard, Table III shows the output binary signals of the signal generator 44 for the above described shading levels. More particularly, Table III illustrates the signal generator 44 produces a set of output signals Q2, Q1 and Q0 indicative of a binary count. The state of the output signals Q2, Q1 and Q0 is advanced on every dot clock in a predetermined order (1, 5, 2, 4, 3, 0, 6) that is repetitive and that is not sequential. This repetitive sequence is determined empirically to prevent the same pixel element from being activated in every frame thus reducing or substantially eliminating any stable or repeating pattern sequence in the displayed image.

An example will help clarify the preceding. In order to produce a medium red shade (level 4 out of 8), the magenta panel 14 and the yellow panel 13 must both be fully off to produce the color white and the cyan panel must be shaded to a level 4 based on the following formulas:

White = Cyan + Magenta + Yellow

Magenta = 0

Yellow = 0

Cyan = 4

White = Cyan at level 4

White − Cyan at level 4 = Medium Red

Stated otherwise, the numerical value of signal A for the magenta and yellow panels will always be a numerical 0 while the numerical value at signal A for the cyan panel will always be a numerical 4.

Referring now to FIG. 5, the top chart 5A relates to a single pixel element in the cyan panel while the bottom chart 5B relates to a corresponding single pixel element in both the magenta panel and the yellow panel. The numbers in each of the rows represents the numerical value of the output signal from the signal generators in each of the video processing units. The shading in each row represents when the video output signal from a comparator circuit in a video processing unit is a logical "1" while no shading represents a logical "0". In this regard, the magenta and yellow panels are always off to produce white, thus no shading is illustrated in of FIG. 5B. FIG. 5A therefore illustrates how the shading level of 4 would be represented for repetitive frame scans comprised of rows A, B and C. Referring to row A, on the average over many scans, the selected pixel will be activated approximately 4 out of every seven frames.

Row B illustrates for the next scan line, where the current sequence (3, 0, 6, 1, 5, 2, 4) is displaced from the row A sequence (1, 5, 2, 4, 3, 0, 6) to distribute the "on" pixels over a different sequence. Row C illustrates the consequence if the signal generator 44 were to repeat the same sequence between two rows; i.e. lines, such as a vertical line would be visible because the same pixel would be repetitively activated each line scan.

TABLE VII

| A FLAG | B FLAG | SIGNAL GENERATOR COUNTING SEQUENCE | | | SIGNAL A EQUALS |
|---|---|---|---|---|---|
| | | Q2 | Q1 | Q0 | |
| | | 0 | 0 | 1 | 1 |
| | | 1 | 0 | 1 | 5 |
| | | 0 | 1 | 0 | 2 |
| 0 | 1 | 0 | 1 | 1 | 3 |
| | | 0 | 0 | 0 | 0 |
| | | 1 | 1 | 0 | 6 |

TABLE VIII

| VIDEO IN: | | SIGNAL B1 STATES | | | SIGNAL B1 VALUE |
|---|---|---|---|---|---|
| 01 | 00 | P1 | P0 | P1 | |
| 0 | 0 | 0 | 0 | 0 | 0 |
| 0 | 1 | 0 | 1 | 0 | 2 |
| 1 | 0 | 1 | 0 | 1 | 5 |
| 1 | 1 | 1 | 1 | 1 | 7 |

Although in the preferred embodiment of the present invention the translating unit translates an analog or digital video input signal from the personal computer 11 into a 4-bit digital signal, it should be understood that the digital input signal (signal Y) may contain fewer than or more than 4-bits to represent a different total number of displayable colors.

For example in the Extended Enhanced Adapter ("EGA") digital system only two bits of color data are supplied to each of the respective video processing units 20, 21 and 22. In this regard two bits of color data (B1, B0) are supplied to the video processing unit 20, two bits of color data (R1, R0) are supplied to video processing unit 21, and two bits of color data (G1, G0) are supplied to video processing unit 22.

In this configuration the output signal from the latch 40 consists of only 2-bits of translated color data (D1, D0) for each primary color which generates an unacceptable level of flicker when the signal generator 44 only generates a 2-bit output signal.

Figure 6:
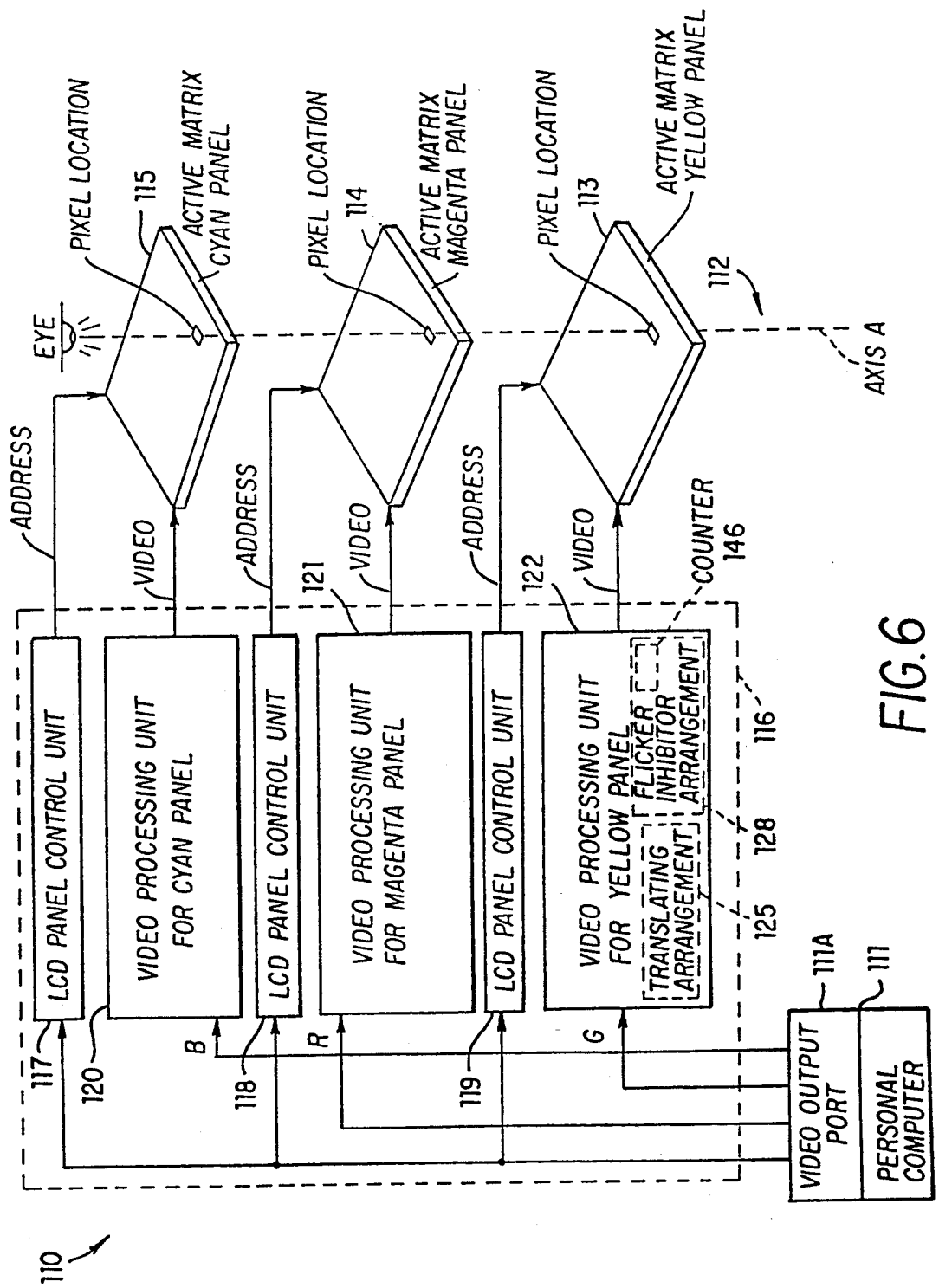
FIG. 6 is a block diagram of another liquid crystal display system using active matrix panels, constructed in accordance with the invention.

Referring now to FIG. 6, there is shown a stacked panel arrangement of active matrix liquid crystal display panels. It will be understood by those skilled in the art that a single active matrix panel (not shown) with color stripes or dot triads can also be employed, using a similar technique. Such active matrix panels with red, green and blue stripes are commonly available from Hitachi, Sharp, and others. In either case, three sets of drive signals are provided, whether the pixels are arranged in a stacked configuration, or adjacent configuration, as well as any other panel configuration. Further, the present inventive system may employ any set of primary colors, and there is no intention to be limited to additive (RGB), or subtractive (T,C,M) techniques.

Figure 7:
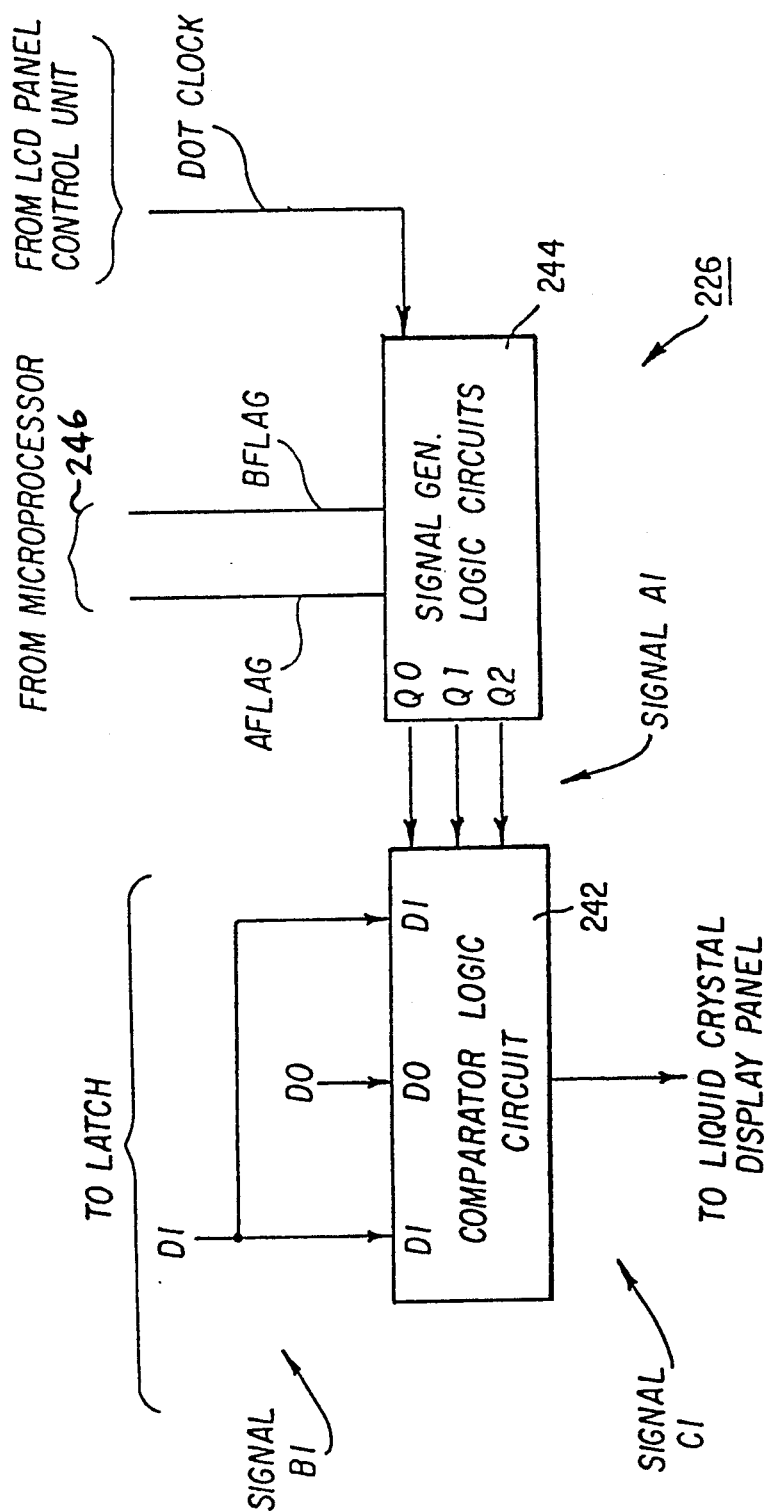
FIG. 7 is a detailed block diagram of another flicker inhibitor arrangement of the system of FIG. 6.

To substantially eliminate the unacceptable level of flicker in the above described situation, a modified flicker inhibitor arrangement 226 is coupled between the microprocessor 38 and the latch 40. As best seen in FIG. 7 the modified flicker inhibitor arrangement 226 is substantially identical to inhibitor arrangement 226 and includes a comparator logic circuit 242, a signal generator logic circuit 244 and a mode selection circuit 246.

The output signals (signal Al) of the signal generator 244 is arranged to translate the 2-bit output signal of latch 40 in a predetermined randomized sequence that optimizes color shading with minimum flicker. In order to convert the 2-bit output signal of latch 40 into a signal bit binary signal that does not produce an unacceptable level of flicker, the comparator circuit 242 is coupled between the 3-bit output signal generator 244 and the 2-bit output signal of the latch 40.

To permit an extended comparison between the 3-bit output signal of the signal generator 244 and the 2-bit output signal of the latch 40, the translated data bits (D1, D0) are coupled to the comparator 242 such that the data bit D1 is connected to the last and most significant bit input of the comparator 242 (FIG. 7).

In operation, as best seen in Table VII, the microprocessor 38 determines the video input signal is a EGA digital color mode and enables the mode selection circuit 246 to be advanced to the 8 shading level mode of operation although the video input signal only includes 2-bits of color data shading levels). By selecting the 8 shading level mode of operation, the signal generator 244 is permitted to cycle through six predetermined states (1, 5, 2, 3, 0, 6). The output signal (signal A1) of the signal generator 244 is then compared with the translated color signal (signal B1) of latch 40. In this regard whenever the binary value of the translated color signal B1 exceeds the binary value of the output signal (signal A1) of the signal generator 244, the comparator logic circuit 242 generates an output signal C1, which gives very good results for the EGA color mode. It should be noted as illustrated in Table VIII, that the translated color signal may vary between four given states (0, 2, 5, 7) that correspond to the four possible input states (0, 1, 2, 3) of the video input signal (signal Y).

Referring now to FIG. 6, there is shown liquid crystal display panel system 110 which is also constructed in accordance with the present invention. The system 110 is adapted to be used with a conventional personal computer 111 having a video output port 111A for generating a video output signal indicative of a color image for visual display purposes.

The system 110 is substantially identical to system 10 but includes a liquid crystal display unit 112 having three stacked monochrome active matrix liquid crystal display panels 113, 114 and 115, respectively, for displaying computer-generated colored images. The active matrix liquid crystal display panels 113, 114 and 115 have a substantially faster response time than the supertwist liquid crystal display panels 13, 14 and 15 in system 10.

Alternatively, a single active matrix color stripe panel could be employed in place of the stacked active matrix panels of FIG. 6. In such a case, interface signals drive the red pixels, the green pixels, and the blue pixels of the single panel.

As best seen in FIG. 6, the system 110 also includes a display panel processing unit 116 having a conventional set of liquid crystal display panel control units 117, 118 and 119 for addressing the individual pixel matrix locations in each of the respective active matrix panels 113, 114 and 115. The display panel processing unit 116 also includes a set of video processing units 120, 121 and 122 that are substantially identical to units 20, 21 and 22 except as will be explained hereunder in greater detail. In this regard, each video processing unit 120, 121 and 122 has a substantially faster dot clock rate and includes a translating arrangement and flicker inhibitor arrangement such as translating arrangement 125 and flicker inhibitor arrangement 128.

In order to facilitate using active matrix liquid crystal display panels and to substantially prevent each of the respective video processing units 120, 121 and 122 from repeating a given count sequence in two consecutive frames, the flicker inhibitor arrangement in each of the video processing units, such as flicker inhibitor arrangement 128, includes a third counter 146 that alters the predetermined counting sequence of its associated signal generator circuit (not shown) during a portion of the HSYNC signal produced by the video output 111A.

Considering now the counter 146 in greater detail with reference to FIG. 8, the counter 146 comprises two flip flops 148 and 149 that generate a single pulse output signal ADVI at the beginning of each HSYNC signal as illustrated by the waveform diagram in FIG. 9. The ADVI signal is logically ORed by gate 152 with the dot clock signal generated by the liquid crystal display panel control unit (not shown) in the video processing unit to cause the signal generator counter (not shown) in the flicker inhibitor arrangement 128 to be advanced an additional count on the occurrences of each HSYNC signal. The additional advancing of the signal generator counter permits an additional degree of randomization within the signal generator counter to ensure that the video processing unit will not repeat a given count sequence in the same order in any two consecutive frames of displayed information. In this regard, each signal generator circuit generates repeatedly a sequence of digital output signals having predetermined numerical values, such as 0, 6, 1, 5, 2, 4 and 3 but which never repeat in a corresponding sequence in any two consecutive frames.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A liquid crystal display panel system comprising:
   a liquid crystal display panel unit for displaying computer-generated color images;
   said liquid crystal display panel unit including a plurality of individual monochromatic liquid crystal display elements, each individual one of said plurality of elements being distinguishable from every other individual one of said plurality of elements by its color producing characteristics;
   a video processing unit for interfacing said display panel unit to a computer processor unit and for producing a graduation in intensity of each individual one of said plurality of elements to produce a large number of color combinations said video processing unit including:
   (a) means for receiving video clock signals for controlling the displaying of information in successive frames each defined by a frame time interval consisting of a predetermined number of said video clock signals;
   (b) means for receiving intensity level signals, each one of said intensity level signals being indicative of a desired shading level for a given pixel image during the same portion of each frame time interval repetitively over a large number of successive frame time intervals;
   (c) signals means responsive to said video clock signals for generating intensity level averaging signals arranged in recurring groups of predetermined ones of said averaging signals;
   (d) said groups of intensity level averaging signals recurring during each frame time interval, each one of said groups consisting of another predetermined number of said averaging signals, said another number not being evenly divisible into said predetermined number of said video clock signals for causing different ones of said averaging signals to occur during successive frame time intervals for a given pixel element; and
   (e) means for comparing individual ones of said intensity level signals and individual ones of said intensity level averaging signals for a given pixel element to cause the individual ones of said plurality of display elements to be activated selectively, whereby the average intensity level for each given pixel image over a large number of successive frames closely approximates said desired shading level.

2. A liquid crystal display panel system according to claim 1 including three monochromatic liquid crystal display panels.

3. A liquid crystal display panel system according to claim 2, wherein one of said monochromatic liquid crystal display panels generates images having a yellow color.

4. A liquid crystal display panel system according to claim 2, wherein one of said monochromatic liquid crystal display panels generates images having a magenta color.

5. A liquid crystal display panel system according to claim 7, wherein one of said monochromatic liquid crystal display panels generates images having a cyan color.

6. A liquid crystal display panel system according to claim 1, wherein said display panel unit includes an active matrix liquid crystal display panel.

7. A liquid crystal display panel system according to claim 1, wherein said panel unit includes three active matrix liquid crystal display panels.

8. A method of optimizing color shading with minimum flicker in a color liquid crystal display panel unit havung a plurality of primary color liquid crystal display element sets, each set with a different color producing characteristic, characterized by the steps of:
receiving video clock signals for controlling the displaying of information in successive frames each defined by a frame time interval consisting of a predetermined number of said video clock signals;
receiving intensity level signals, each one of said intensity level signals being indicative of a desired shading level for a given pixel image during the same portion of each frame time interval repetitively over a large number of successive frame time intervals;
generating intensity level averaging signals arranged in recurring groups of predetermined ones of said averaging signals;
causing different ones of said averaging signals to occur during successive frame time intervals for a given pixel element;
said predetermined ones of said averaging signals each having a numerical value;
comparing during each video clock signal the numerical values of individual ones of said intensity level averaging signals with individual ones of said intensity level signals for a given pixel element to cause the individual ones of said plurality of display element sets to be activated selectively, whereby the average intensity level for each given pixel image over a large number of successive frames closely approximate said desired shading level; and
generating a synchronized binary video output signal for each one of the liquid crystal display element sets to activate corresponding individual pixel elements in each of the liquid crystal display element sets.

9. A method according to claim 8 wherein the binary video output signal is generated whenever the numerical value of an individual one of said intensity level signals exceed the numerical value of an individual one of said intensity level averaging signals.

10. A method according to claim 8 wherein the intensity level averaging signals have recurring sequence values of 1, 3, 5 for four levels of color shading.

11. A method according to claim 8 wherein the intensity level averaging signals have recurring sequence values of 1, 5, 2, 4, 3, 0, 6 for eight levels of color shading.

12. A method according to claim 8 wherein the intensity level averaging signals have recurring sequence values of 0, 1, 2, 3, 4, 5, 6, 7, 10, 11, 12, 13, 14, 15, 16 for sixteen levels of color shading.

13. A method according to claim 8 wherein the intensity level averaging signals have recurring sequence values of 0, 1, 2, 4, 5, 7, 10, 11, 12, 13, 14.

14. A method according to claim 8 further comprising changing the predetermined sequence of said intensity level averaging signals periodically for substantially preventing repetitive activation of pixel elements in adjacent rows.

15. A system for displaying a large number of different color images, comprising:
display panel means for displaying computer-generated color images;
said display panel means including a plurality of electrically responsive pixel elements, each individual one of said plurality of pixel elements generating a pixel image having a distinguishable color shading level over a large number of successive frame time intervals;
video processing unit means for interfacing said display means to a computer processor unit and for causing individual ones of said pixel elements to be energized to produce a large number of shading levels;
said video processing unit means including: means for receiving video clock signals for controlling the displaying of information in successive frames each defined by an individual one of said successive frame time intervals, said individual frame time interval consisting of a predetermined number of said video clock signals;
means for receiving intensity level signals, each one of said intensity level signals being indicative of a desired shading level for a given pixel image during the same portion of each frame time interval repetitively over said large number of successive frame time intervals;
signals means responsive to said video clock signals for generating intensity level averaging signals arranged in recurring groups of predetermined ones of said averaging signals;
said groups of intensity level averaging signals recurring during each frame time interval, each one of said groups consisting of another predetermined number of said averaging signals, said another number not being evenly divisible into said predetermined number of said video clock signals for causing different ones of said averaging signals to occur during successive frame time intervals for a given pixel element; and
means for comparing individual ones of intensity level signals and individual ones of intensity level averaging signals for a given pixel element to cause the individual ones of said plurality of pixel elements to be activated selectively, whereby the average intensity level for each given pixel image over a large number of successive frames closely approximates said desired shading level.

16. A system according to claim 15, wherein said display means is stacked liquid crystal panel means.

17. A system according to claim 15, wherein said display means is active matrix panel means.

18. A system according to claim 15, wherein said display means is passive matrix panel means.

19. A system according to claim 15, wherein said display means is active matrix color stripe means.

20. A system according to claim 15 wherein said frame time interval is a recurring frame time interval of a sufficient time duration to allow individual ones of said plurality of pixel elements to be energized in a random manner for controlling the average duty cycle of a pixel image to produce graduations in shading levels without substantially introducing flicker.

21. A system according to claim 20, wherein said frame time interval has a duration of about 33.3 milliseconds.

22. A system according to claim 16 wherein individual ones of the pixel images are combined by a color additive process to help facilitate the generation of a large number of different colors.

23. A system according to claim 16 wherein individual ones of the pixel images are combined by a color subtractive process to help facilitate the generation of a large number of different colors.

24. A system according to claim 22 wherein the color of an individual pixel image is selected from the colors consisting of red, green and blue.

25. A system according to claim 23, wherein the color of an individual pixel image is selected from the colors consisting of yellow, cyan and magenta.

26. A system for displaying a full color visual image, comprising:

panel means for displaying the full color visual image;

video processing unit means for energizing electrically said panel means to cause the full color image to be produced by said panel means and for causing said panel means to produce multiple color intensities for different colors, said video processing unit means including:

means for receiving video clock signals for controlling the displaying of the visual image in successive frames, each one of said frames being defined by a frame time interval, said frame time interval being defined by a frame time predetermined number of said video clock signals;

means for receiving intensity level signals, each one of said intensity level signal being indicative of a desired pixel image shading level for a given pixel element during a large number of successive frame time intervals;

means responsive to said video clock signals for producing a series of intensity level averaging signals arranged in recurring groups of said averaging signals;

said groups of intensity level averaging signals recurring during each frame time interval, each one of said groups including a shading level predetermined number of said averaging signals, said shading level predetermined number not being evenly divisible into said frame time predetermined number for causing different ones of said averaging signals to occur during successive frame time intervals for a given pixel element; and means for comparing the individual ones of said intensity level signals and individual corresponding one of said intensity level averaging signals to develop an output signal to cause the display system to be activated selectively whenever the value of the intensity level signal is at least equal to the value of said corresponding intensity level averaging signal, whereby the average intensity level for each pixel image over a larger number of successive frame closely approximates said desired pixel image shading level.

27. A system for displaying a full color visual image, comprising:

panel means for displaying the full color visual image;

video processing unit means for energizing electrically said panel means to cause the full color image to be produced by said panel means and for causing said panel means to produce multiple color intensities for different colors, said video processing unit means including:

means for receiving video clock signals for controlling the displaying information in successive frames, each one of said frame being defined by a frame time interval, said frame time interval being defined by a frame time predetermined number of said video clock signals;

means for receiving intensity level signals, each one of said intensity level signals being indicative of a desired pixel image shading level for a given pixel element during a larger number of successive frame time intervals;

signal means responsive to said video clock signals for generating intensity level averaging signals arranged in recurring groups of said averaging signals;

said groups of intensity level averaging signals recurring during each frame time interval, each one of said groups including a shading level predetermined number of said averaging signals, said shading level predetermined number not being evenly divisible into said frame time predetermined number for causing different ones of said averaging signals to occur during successive frame time intervals for a given pixel element; and means for comparing individual ones of said intensity level signals and individual ones of said intensity level averaging signals for a given pixel element to cause the display system to be activated selectively, whereby the average intensity level for each given pixel image over a larger number of successive frame closely approximates said desired pixel image shading level.

28. A system for displaying a full color visual image, comprising:

panel means for displaying the full color visual image, said panel means displaying a plurality of pixel images, in successive frames, each frame defined by a frame time interval;

video processing unit means for energizing electrically said panel means to cause the full color image to be produced by said panel means and for causing said panel means to produce multiple color intensities for different colors, said video processing unit means including:

means for supplying first number signals, for each pixel in a visual image, each one of said first number signals representing the color of the pixel image to be displayed at a given pixel element location;

means for supplying second number signals;

means for providing a count of the second number signals to a particular value on a repetitive basis;

means responsive to said individual ones of said first number signals and said means for providing a count for developing third signals for each given pixel element location in accordance with the characteristics of said first signals as compared to the output of said means for providing a count, said output simultaneously occurring for each such pixel element location; and means for providing a video output signal for each said given pixel element location in accordance with the development of the third signals for the pixel images in each successive frame.

29. A system for displaying a full color visual image, comprising:

panel means for displaying the full color visual image;

video processing unit means for energizing electrically said panel means to cause the full color image to be produced by said panel means and for causing said panel means to produce multiple color intensities for different colors, said video processing unit means including:

means for providing intensity level signals to represent the intensity level of each displayable pixel in the visual display;

counting means for generating a series of pseudo intensity level signals indicative of a series of numbers ranging between a maximum value and a minimum value where each number in said series of numbers corresponds to a pseudo shading level for an individual displayable pixel forming part of the full color visual image;

means for comparing said intensity level signals and said pseudo intensity level signals for each displayable pixel location of each one of the frames in the visual display and for developing a video output signal when the intensity level signal is at least equal to a corresponding pseudo intensity level signal; and means for causing said means for comparing to compare repeated each intensity level signal corresponding to a given pixel, with another ones of the pseudo intensity level signals corresponding to the given pixel for individual ones of a sufficiently large number of the successive frames to produce a desired average shading level corresponding substantially to the intensity level of said displayable pixel.

30. A method for displaying a full color visual image, comprising:

using panel means for displaying the full color visual image;

using video processing unit means for energizing electrically said panel means to cause the full color image to be produced by said panel means;

producing intensity level signals to represent the intensity level of each displayable pixel of the visual image;

generating a series of pseudo intensity level signals indicative of a series of numbers ranging between a maximum value and a minimum value, where each number in said series of numbers corresponds to a pseudo shading level for an individual displayable pixel forming part of the full color visual image;

comparing said intensity level signals and said pseudo intensity level signals for each displayable pixel location of each one of the frames in the visual display and for developing a video output signal when the intensity level signal is at least equal to a corresponding pseudo intensity level signal; and comparing repeatedly each intensity level signal corresponding to a given pixel, with another one of the pseudo intensity level signals corresponding to the given pixel for individual ones of a sufficiently large number of the successive frames to produce a desired average shading level corresponding substantially to the intensity level of said displayable pixel.

31. A system for displaying a full color visual image, comprising:

panel means for displaying the full color visual image;

video processing unit means for energizing electrically said panel means to cause the full color image to be produced by said panel means and for causing said panel means to produce multiple color intensities for different colors, said video processing unit means including:

means for providing a visual display;

means for providing a raster scan of each pixel in the successive frames of the visual display;

means for providing for each displayable pixel in the raster scan of the successive frames of the visual display control signals representing the shading levels for each said displayable pixel;

means for causing the control signals representing the shading levels for each of the individual displayable pixels in the raster scan to be displayed in a substantially flicker free manner;

means for segregating the successive frames into groups, each such group having a given number of successive frames; and said means providing control signals developing a video signal selectively for individual pixels only an average number of times in any group of successive frames and to develop said video signal in different frames in successive groups on a random basis.

32. A system for displaying a full color visual image, comprising:

panel means for displaying the full color visual image;

video processing unit means for energizing electrically said panel means to cause the full color image to be produced by said panel means and for causing said panel means to produce multiple color intensities for different colors, said video processing unit means including:

intensity level averaging means for generating a predetermined set of recurring averaging signals indicative of a given number of different intensity level, said signals within said set being generated individually seriatim;

means for receiving a level determining signal corresponding to a selected one of said different intensity level recurring signals said level determining signal being indicative of a desired intensity level for a given pixel element image;

means for comparing said level determining signal and individual ones of the recurring averaging signals to cause said display system to be activated selectively;

means for receiving recurring display frame determining signals to cause said intensity level means to generate the next one of its averaging signals, said predetermined set of recurring signals defining an averaging time interval not being evenly divisible into each one of the frame time intervals to cause the averaging time intervals and the frame time intervals to be asynchronous relative to one another; and wherein said means for comparing being responsive to said frame determining signals during the same portion of each frame time interval, whereby the average intensity level over a larger number of frames closely approximates a selected intensity level.

33. A system for displaying a full color visual image, comprising:

panel means for displaying the full color visual image;

video processing unit means for energizing electrically said panel means to cause the full color image to be produced by said panel means and for causing said panel means to produce multiple color intensities for different colors, said video processing unit means including:

means for receiving video clock signals for controlling the displaying of the visual image in successive frames, each one of said frames being defined by a frame time interval, said frame time interval being defined by a frame time predetermined number of said video clock signals;

means for receiving intensity level signals, each one of said intensity level signal being indicative of a desired pixel image shading level for a given pixel element during a large number of successive frame time intervals;

means for generating a series of intensity level averaging signals arranged in recurring groups of said averaging signals;

means for causing different ones of said averaging signals to occur during successive frame time intervals for a given pixel element; and means for comparing the individual ones of said intensity level signals and individual corresponding ones of said intensity level averaging signals for a given pixel element to develop an output signal to cause a display system to be activated selectively, whenever the value of the intensity level signal is at least equal to the value of said corresponding intensity level averaging signal whereby the average intensity level for each given pixel image over a large number of successive frames closely approximates said desired image shading level.

34. In a display system for producing a full color image composed of a group of pixels, over a large number of successive frame time intervals, video processing unit means comprising:

means for receiving shaded color signals indicative of desired color intensity levels of individual ones of the pixels forming the full color image;

means for generating a series of shading level averaging signals to help inhibit flicker in the full color image displayed over the large number of successive frame time intervals;

comparator means responsive to said shaded color signals and to said averaging signals for developing video output signals indicative of the full color image to be displayed whenever the value of an individual one of said shaded color signals is at least equal to the corresponding value of an individual one of said averaging signals during individual frame time intervals in the large number of successive frame time intervals so that said video output signals have a duty cycle over the large number of successive frame time intervals to form the full color image in a substantially flicker free manner.

35. In a display system for producing a full color image, video processing unit means in accordance with claim 34, wherein said means for generating is a signal generator that produces a pre-set recurring non-sequential set of averaging signals.

36. In a display system for producing a full color image, video processing unit means in accordance with claim 35, wherein each one of said pre-set recurring non-sequential set of averaging signals have substantially different values relative to one another.

37. In a display system for producing a full color image, a video processing unit means in accordance with claim 34, wherein said averaging signals are a recurring set of averaging signals.

38. In a display system for producing a full color image, video processing unit means in accordance with claim 35, wherein said signal generator is reset at least once during each frame time interval in the large number of successive frame time intervals.

39. A system for displaying a full color visual image, comprising:

panel means for displaying the full color visual image;

video processing unit means for energizing electrically said panel means to cause the full color image to be produced by said panel means and for causing said panel means to produce multiple color intensities for a different color, said video processing unit means including:

means for receiving video clock signals for controlling the displaying of the visual image in successive frames, each one of said frames being defined by a frame time interval, said frame time interval being defined by a frame time predetermined number of said video clock signals;

means for receiving intensity level signals, each one of said intensity level signal being indicative of a desired pixel image shading level for a given pixel element during a large number of successive frame time intervals;

means for generating a series of intensity level averaging signals arranged in recurring groups of said averaging signals;

means for causing different ones of said averaging signals to occur during successive frame time intervals for a given pixel element; and means for comparing the individual ones of said intensity level signals and individual corresponding ones of said intensity level averaging signals for a given pixel element to develop an output signal to cause a display system to be activated selectively, whenever the value of the intensity level signal is greater than the value of said corresponding intensity level averaging signal whereby the average intensity level for each given pixel image over a large number of successive frames closely approximates said desired image shading level.

40. A system for displaying a full color visual image, comprising:

panel means for displaying the full color visual image;

video processing unit means for energizing electrically said panel means to cause the full color image to be produced by said panel means and for causing said panel means to produce multiple color intensities for a different color, said video processing unit means including:

means for receiving video clock signals for controlling the displaying of the visual image in successive frames, each one of said frames being defined by a frame time interval, said frame time interval being defined by a frame time predetermined number of said video clock signals;

means for receiving intensity level signals, each one of said intensity level signal being indicative of a desired pixel image shading level for a given pixel element during a large number of successive frame time intervals;

means for generating a series of intensity level averaging signals arranged in recurring groups of said averaging signals;

means for causing different ones of said averaging signals to occur during successive frame time intervals for a given pixel element; and means for comparing the individual ones of said intensity level signals and individual corresponding ones of said intensity level averaging signals for a given pixel element to develop an output signal to cause a display system to be activated selectively, whenever the value of the intensity level signal is less than the value of said corresponding intensity level averaging signal whereby the average intensity level for each given pixel image over a large number of successive frames closely approximates said desired image shading level.

41. In a display system for producing a full color image composed of a group of pixels, over a large number of successive frame time intervals, video processing unit means comprising:

means for receiving intensity level signals, each one of said intensity level signal being indicative of a desired pixel image shading level for a given pixel element during a large number of successive frame time intervals;

means for generating a series of intensity level averaging signals arranged in recurring groups of said averaging signals;

means for causing different ones of said averaging signals to occur during successive frame time intervals for a given pixel element; and means for comparing the individual ones of said intensity level signals and individual corresponding ones of said intensity level averaging signals for a given pixel element to develop an output signal to cause a display system to be activated selectively, whenever the value of the intensity level signal is at least equal to the value of said corresponding intensity level averaging signal whereby the average intensity level for each given pixel image over a large number of successive frames closely approximates said desired image shading level.

42. In a display system for producing a full color image, video processing unit means in accordance with claim 41, wherein said means for generating is a signal generator that produces a pre-set recurring non-sequential set of averaging signals.

43. In a display system for producing a full color image, video processing unit means in accordance with claim 42, wherein each one of said pre-set recurring non-sequential set of averaging signals have substantially different values.

44. In a display system for producing a full color image, video processing unit means in accordance with claim 42 wherein said signal generator is reset at least once during each frame time interval in the large number of successive frame time intervals.

* * * * *

UNITED STATES PATENT AND TRADEMARK OFFICE
CERTIFICATE OF CORRECTION

PATENT NO. : 5,153,568
DATED : October 6, 1992
INVENTOR(S) : Robert W. Shaw

It is certified that error appears in the above-indentified patent and that said Letters Patent is hereby corrected as shown below:

On the title page, item [75] Inventor: before Robert W. Shaw, Escondido, Calif., insert --Leonid Shapiro, Lakeside, Calif., Lane T. Hauck, San Diego, Calif., and Randall S. Farwell, San Diego, California--

On title page, item [19] change "Shaw" to read --Shapiro--

Column 15, line 19, delete "7", and substitute therefor --2--

Column 15, line 31, delete "havung" should read --having--

Signed and Sealed this

Eighth Day of February, 1994

Attest:

BRUCE LEHMAN

Attesting Officer

Commissioner of Patents and Trademarks